June 11, 1957 R. H. E. M. BÉRANGER 2,795,378

APPARATUS FOR SUBTRACTING NUMBERS REPRESENTED BY CODED PULSES

Filed June 3, 1954

United States Patent Office 2,795,378
Patented June 11, 1957

2,795,378

APPARATUS FOR SUBTRACTING NUMBERS REPRESENTED BY CODED PULSES

Raymond Henry Elie Marie Béranger, Paris, France, assignor to Compagnie des Machines Bull (Societe Anonyme), Paris, France Application June 3, 1954, Serial No. 434,243
Claims priority, application France June 4, 1953
5 Claims. (Cl. 235—61)

Figure 1:
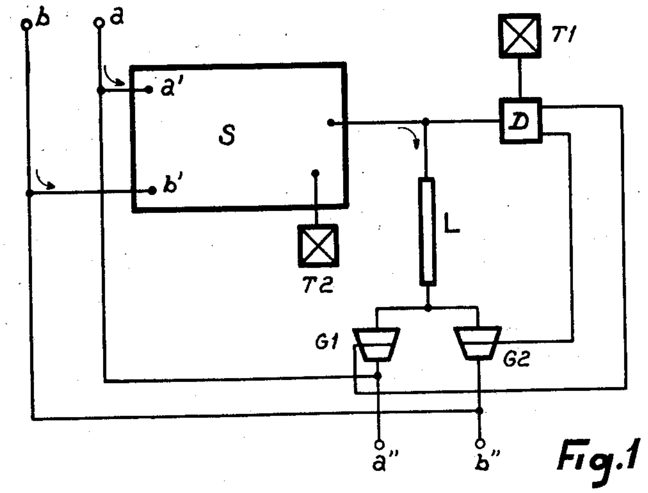

The present invention relates to a method of subtraction and a subtractor assembly for introduced terms and a result emitted in the form of coded impulses. Each of the terms of the subtraction is assumed to be represented in known manner by a number of impulses, each of which is emitted at one of a series of characteristic instants forming a regular timed sequence, each having a conventional value, these instants being, for example, materialised by a corresponding series of impulses known as timing impulses. By way of illustration, it will be assumed, without thereby limiting the invention, that these instants can be grouped in successive sets of four having as conventional values $1.10^k$, $2.10^k$, $4.10^k$, $8.10^k$, $k$ taking the successive values 0, 1, 2. . . etc., from the origin of the times (this method of representation being called semi-binary for the sake of simplicity).

The invention has for its object to provide a subtractor assembly for terms in the form of coded impulses of the aforesaid type, which is designed always to supply, as result, the absolute value of the difference of the two terms introduced into the said assembly, the inputs for the introduction of these terms being allocated thereto independently of the relative magnitude, and if desired to furnish the indication of the sign of the said difference.

In other words, the invention has for its object to provide a subtractor assembly operating with automatic rectification of the difference.

The invention also has for its object to provide a method of subtraction for obtaining the absolute value of a difference, which consists in using an arithmetical subtractor for coded impulses (which normally supplies a correct result provided that the smaller number is deducted from the larger number), associated with an impulse-circulation line, and in operating in two phases, namely a first phase in which the two numbers to be subtracted one from the other are introduced into the arithmetical subtractor by predetermined inputs, without regard to their relative magnitudes, and a second phase in which, as a function of a special characteristic which may appear at the units figure of highest order, such as a value 9, or 15, or a carry-over, the result obtained in the first phase is stored, or a new operation gives the absolute value sought, preferably by rectification of the result obtained in the first phase.

The invention accordingly also has for its object to provide a subtractor assembly comprising an arithmetic subtractor associated with an impulse-circulation line, means adapted to detect the appearance of the said characteristic at the units figure of highest order in the result, and to modify the circulation of the impulses under the control of the said means.

The invention further concerns a so-called subtractor assembly of the type specified, which is composed of electronic trigger circuits, delay lines and electronic switches or the like.

The invention finally concerns a subtractor for terms represented by impulses on the binary notation system, which is of novel type and has the advantage that it comprises only two electronic trigger circuits, two electronic switches of the like and four delay elements.

Figure 2:
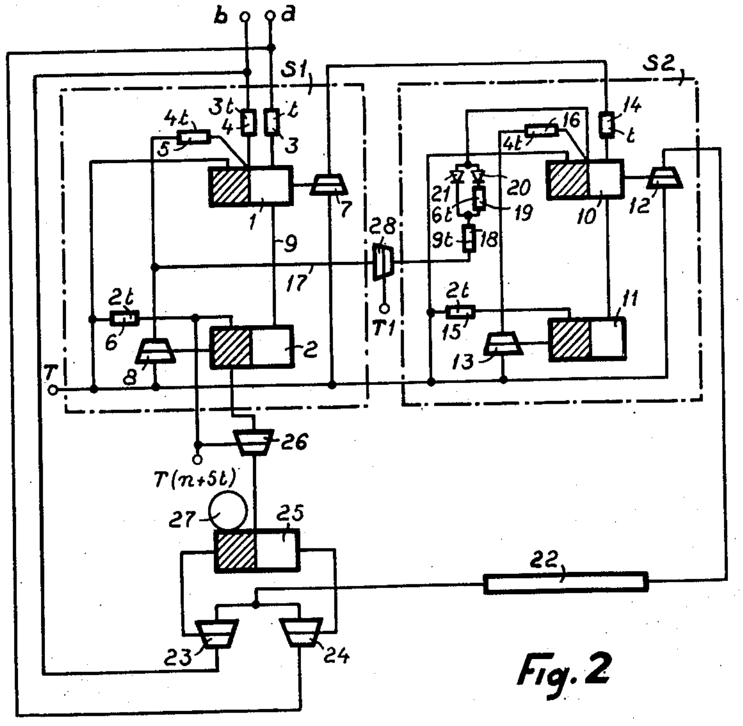

The invention will be more readily understood by reference to the accompanying drawings, in which:

Figure 1 is a circuit diagram illustrating the principle of the assembly according to the invention, and Figure 2 is a diagram illustrating the construction of an assembly according to the invention, which operates with electronic trigger circuits.

In order that the invention may be readily understood, the subtraction $A-B$ of the introduced terms, for example with $A=1270$ and $B=453$, will be introduced. The capacity of the circulation system in which the subtraction is to be effected will be assumed for the sake of simplicity to be 6 figures, and the operation is therefore expressed as follows:

$$\begin{array}{r} 0\,0\,1\,2\,7\,0 \\ -0\,0\,0\,4\,5\,3 \\ \hline 0\,0\,0\,8\,1\,7 \end{array}$$

it being understood that the subtraction takes place in the arithmetical subtractor by successive groups corresponding to the different unit orders commencing with the lowest order (3 and 0). The number 817 thus obtained represents the absolute value of the difference, and the sign of this difference may be assumed to be + (A greater than B)

If the subtraction $A-B$ with $A=453$ and $B=1270$ is now considered, the operation is expressed as follows:

$$\begin{array}{r} 0\,0\,0\,4\,5\,3 \\ -0\,0\,1\,2\,7\,0 \\ \hline 9\,9\,9\,1\,8\,3 \end{array}$$

and a carry-over occurs at the sixth place, which was not so in the previous case.

The value thus found for the result is not the true value, which is 817. According to the invention, a correction is made to the provisional result by the following operation:

$$\begin{array}{r} 0\,0\,0\,0\,0\,0 \\ -9\,9\,9\,1\,8\,3 \\ \hline 0\,0\,0\,8\,1\,7 \end{array}$$

again with the production of a carry-over at the sixth place.

As characteristic permitting of detecting that the provisional difference must be corrected, and of controlling the correction, it is possible to use the fact that the last figure to the left is a 9. This figure could therefore be detected and compared with 9, and the result of the comparison, or the two impulses of values 1 and 8 forming this figure in semi-binary representation, could be utilized to actuate the correcting member.

Another characteristic which may be employed is the emission of the carry-over. This carry-over takes place, in the case where the correction is necessary, both at the end of the second phase and at the end of the first phase. It may therefore be used both to initiate the correction and to stop it.

Consequently, the device according to the invention, in its more advantageous form, (1) detects during a first operating phase, that a carry-over is going to occur in the last place to the left, (2) utilises the result of this detection to control the storage of the result, for example in the circulation loop passing through the upper input of the arithmetical subtractor (input corresponding to the figure A), or the correction, preferably by introduction into the lower input of the arithmetical subtractor (input corresponding to the figure B) of the provisional difference obtained in the first phase, and (3) stops or cancels the carry-over in the last place.

It is to be noted that it would be possible without departing from the scope of the invention, instead of starting with the provisional result supplied by the first phase, to cancel the result, if necessary, under the control of the characteristic detected in the last figure to the left of the result, and to recommence the operation, the terms being permuted in order to enter them into the subtractor. This method is not preferred, because the operations to be performed are in fact more complicated and more difficult to control, and in addition it implies a longer stoppage of the memories containing the starting terms, while with the previously mentioned device they can be emptied once and for all in the subtractor.

Figure 1 shows in conjunction with the foregoing how it is possible to carry the invention into effect. There arrive at the terminals *a* and *b* the impulses representing in coded form the terms to be subtracted, which are extracted for example from circulation memories comprising loops formed of delay elements and regenerators, or of static memories composed of a series of electronic triggers or flip-flops, or of magnetic drum-type memories, etc. The said impulses arrive at the inputs *a'*, *b'* of the subtractor S through the connections provided for this purpose.

The inputs *a'* and *b'* and the construction of the subtractor S are so designed that A is larger than B, failing which the result supplied by the subtractor would have no practical signification, apart from the rectification to be effected in accordance with the invention. The subtractor supplies to a delay line L and the circulation loop is closed by *a'* or *b'* according to which of the two switches G1 and G2 (electronic switches or gate of any known type) is closed, if necessary with the inter-position of regenerators (not shown). A being first of all assumed to be greater than B for the purpose of explaining the operation, it is necessary for G1 alone to be closed in order that, once the introduction of the terms into the subtractor has been completed, the result emitted by the latter can be retained as long as is desired in the circulation loop comprising S and L. On the other hand, if A, which is always introduced through *a'*, is smaller than B, the result is of the type in which the last figure to the left is a 9 (see the foregoing numerical example) and does not signify an arithmetical difference. For this reason, when the introduction has been completed G2 alone must be closed, and the impulses of the provisional result applied during only one circuit to the terminal *b'*, the terminal *a'* receiving nothing, that is to say, zeros. The device then effects the subtraction from zero of the provisional result supplied in the first phase, and thus rectifies this result, which may then be kept in the loop S—L—G1—*a'*. It is therefore necessary to control the state of the switches G1 and G2 by means of a device D for detecting 9 or for detecting the carry-over which will be formed, sensitised by a control T1 only at the instant corresponding to the passage of the last figure to the left. As has been explained, it is also necessary to stop the carry-over in the last place, and for this purpose a special control is provided at T2.

Although the arrangement described is preferred in carrying the invention into effect, numerous modifications may be envisaged. In particular, when the result need not be rectified, or need no longer be rectified, it is possible, instead of returning it to *a'*, to despatch it through *a''* to a storage memory. The result can thus be rectified in another subtractor by passing it through *b''* if the subtractor S is required at this instant.

Figure 2 shows by way of illustrative example and in a more detailed manner how the invention can be carried into effect. The subtractor is here formed of two partial subtractors of similar type which are each adapted to operate correctly on terms written on the binary notation system. The utility of the association of these two subtractors for semi-binary numbers will hereinafter be explained. It is first necessary to explain the construction and the operation of one of the subtractors, for example of S1.

Such a subtractor comprises two electronic trigger circuits 1 and 2, four delay elements 3, 4, 5 and 6 and two gates 7 and 8, the whole being mounted as indicated and adapted to supply, at the output of the gate 7, impulses representing the difference between the terms A and B, expressed in binary form by preferably negative impulses applied to the terminals *a* and *b*, which impulses coincide with some of the regularly recurring timing impulses supplied to the terminal T. The electronic trigger circuits 1 and 2 may be of any known type having two equally stable states of equilibrium into which they pass alternately under the influence of the applied impulses. They may be, for example, of the type described in French Patent No. 994,531 of the July 17, 1949. It is stated in this patent, in particular, that such a trigger circuit may have two types of inputs, one called the "symmetrical" input, through which an impulse applied to the input always causes the trigger circuit to change from one state of equilibrium to the other, and at least one other, called the "asymmetrical" input, through which an applied impulse can only cause the trigger circuit to change over when it is in a particular one of the two possible states of equilibrium. The impulses from A arrive at an asymmetrical input, as also do the timing impulses T, while those applied by *b* arrive at a symmetrical input. The gates 7 and 8 are conductive for only one of the two states of equilibrium of the trigger circuit and are for this purpose controlled by a voltage set up at an appropriate point, for example at the plate of one of the two valves of the trigger circuit. They may be of any appropriate form, for example of the type comprising an electronic valve. The impulses arriving through the element 5 are carry-over impulses. It is stipulated that the magnitude of the delay *t* is at most equal to one-fifth of the binary period, the values of the delays of the elements 3, 4, 5 and 6 preferably being those plotted on the drawing or in the neighbourhood thereof (*t*, 3*t*, 4*t*, 2*t*). In fact, as will be seen, *t* is made equal to *p*/6 (one-sixth of the binary period).

It is recalled that the different possible cases for impulses of the terms A, B and of the carry-over R which are applied are the following for a subtraction in the binary system.

| | I | II | III | IV | V | VI | VII | VIII |
|---|---|---|---|---|---|---|---|---|
| A | 0 | 1 | 0 | 1 | 1 | 0 | 1 | 0 |
| B | 0 | 0 | 1 | 1 | 0 | 1 | 1 | 0 |
| R | 0 | 0 | 0 | 0 | 1 | 1 | 1 | 1 |
| Difference | 0 | 1 | 1 | 0 | 0 | 0 | 1 | 1 |
| Carry-over emitted | 0 | 0 | 1 | 0 | 0 | 1 | 1 | 1 |

a 0 indicating the absence of an impulse and a 1 indicating the presence of an impulse, and also representing the values 0 and 1 in the binary system. At each characteristic instant, in coincidence with a timing impulse, there is or is not produced in the subtractor considered a carry-over impulse (carry-over emitted) which must be applied to the input of the subtractor one binary period *p* later.

The construction and operation of the said substractor will be more readily understood by considering successively the different cases which have been included in the foregoing table.

*Case I.*—Since no impulse is applied to the inputs, apart from the timing impulse, the latter determines the state of the trigger circuits in which the gates 7 and 8 remain blocked. Subsequently at the end of the binary period no impulse leaves the subtractor and no carry-over impulse is emitted.

*Case II.*—An impulse is applied only to *a*. Therefore, at the end of the period, the gate 7 is conductive and emits an impulse (the difference=1). At the end of the time *t* after the characteristic instant of the commencement of the period, the trigger circuit having changed over, an impulse is emitted and applied through the connection 9 to the trigger circuit 2, which changes over.

However, the latter is returned into the inoperative position by the timing impulse at the time $2t$. Therefore, at the end of the period, the carry-over emitted is zero, since the gate 8 is blocked.

*Case III.*—An impulse is applied only to *b*. The difference is equal to 1 as before. However, as regards the carry-over, since the delay of the element 4 is $3t$, while that of the element 6 is $2t$, the timing impulse is the first to arrive at the trigger circuit 2. It therefore first fixes the gate 8 in the blocked position, since the impulse arriving through the connection 9 renders the trigger circuit 2 conductive. A carry-over is therefore emitted at the end of the period.

*Case IV.*—An impulse is first set up at *a*, and then another at *b*. The trigger circuit 1 therefore changes over twice and the gate 7 remains blocked at the end of the period (the difference equals 0). The first change-over of the trigger circuit at the time *t* produces the emission of an impulse at the connection 9, and the trigger circuit 2 changes over. It is returned to the inoperative state by the timing impulse. The second change-over of the trigger 1 does not produce any impulse emission at the connection 9. There is therefore no carry-over emitted.

*Case V.*—An impulse is first set up at *a*, then a carry-over impulse. This case is identical with the previous case, except that the said second change-over takes place at the time $4t$ instead of at the time $3t$ (the times being calculated with respect to the commencement of the binary period). It is to be noted that the term B and the carry-over R play a symmetrical part. The values of the delays of the elements 4 and 5 could be permuted.

*Case VI.*—Two impulses belonging to B and R are applied successively in the period. The trigger 1 changes over twice. Consequently, the gate 7 is blocked and the difference is zero. The impulse produced at the connection 9 at the time of the first change-over, i. e. at the time $3t$ finds the trigger circuit 2 in the inoperative state (if it were not so, it has been changed thereto at the time $2t$ by the timing impulse). The trigger circuit 2 therefore passes into the operative state and the gate 8 is conductive. A carry-over impulse is emitted. The second change-over of the trigger circuit 1 does not result in an impulse being set up at the connection 9, as already stated.

*Case VII.*—Three impulses belonging to A, B and R are successively applied. Until the time $3t$, the phenomena are the same as for the case IV, and the carry-over impulse is then applied at the time $4t$. The latter changes over the trigger circuit 1, and also the trigger circuit 2, since an impulse is produced by the connection 9 this time. The results are therefore the reverse of those of case IV (difference and carry-over emitted are zero).

*Case VIII.*—The carry-over impulse is applied. The trigger circuit 1 passes into the operative position and unblocks the gate 7. An impulse is therefore emitted at the end of the period, representing the difference. In addition, the impulse emitted at the connection 9 at the time of the change-over of the trigger circuit 1 causes the trigger circuit 2, which has been inoperative at least since the time $2t$ owing to the timing impulse received, to change over into the operative position. The results are therefore the same as for case VII.

It will therefore be seen that the results are as indicated in the foregoing table, that is to say, that the subtractor according to the invention functions correctly for binary terms. It is to be noted, and this will be useful in the following, that the carry-over impulse to be emitted is potentially formed at the time $3t$ or at the time $4t$ if the trigger circuit 2 is in the operative position at this instant.

For terms represented on the semi-binary system and entering such a subtractor, a correction may (or may not) have to be made on each figure of the result. In fact, if two figures which are to be subtracted one from the other, for example 4 and 7, are introduced into the subtraction in such manner that the smaller is subtracted from the larger, for example 7—4=3, it is clear that the result (3) will be lower than 10, since the two figures from which it is derived (7 and 4) are themselves lower than 10. If the reverse is the case (the larger is subtracted from the smaller, i. e. 4—7), the subtractor will automatically borrow from the higher binary order, which is 16 in the binary system. It will therefore perform 4+16—7=13 in the numerical example chosen, and in such a case a carry-over representing the borrowed value 16 is produced. On the other hand, in the usual decimal operation, the higher decimal order is borrowed from. In the foregoing numerical example, the operation is 4+10—7=7. It will be seen that in order to obtain the true figure (7) it is sufficient to deduct from the provisional figure first obtained (13) the quantity 6=16—10 (difference between the bases of the two systems), controlling this subtraction by the presence of a carry-over at the end of the semi-binary period.

In accordance with the invention, this operation preferably takes place in a subtractor S2, which is advantageously of the same type as S1. (It will also be possible to store impulses of value 6 for each decimal order in which a carry-over is produced at the end of a semi-binary period, for example in a circulation memory, and to use the same and only subtractor in an additional operating phase.) This subtractor comprises two trigger circuits 10, 11, two gates 12, 13 and delay elements, of which one 14, corresponds to the term A in the subtractor S1, another, 15, to the timing impulse, and another, 16, to the internal carry-over. The operation of S2 is the same as that of S1. A particular feature, however, resides in that the term corresponding to B is always composed of figures 6 and 0, the first being derived from the internal carry-over of S1 at the time of value 1 of each semi-binary period through the connection 17, the gate 28 open at this instant (and therefore at every fourth binary period), the delay element 18 of delay value $9t$, and a branch permitting of setting up two impulses, one of value 4, by means of the delay element 19, of delay value $6t$, and the uni-directional cell 20, and the other of value 2 by means of the uni-directional cell 21.

The impulse obtained at the output of S2 passes into a delay line 22 and then through one of the gates 23, 24 (identical to L and G1, G2 of Figure 1) in order to return to the subtractor.

The conductive or blocked conditions of the two gates 23, 24 are controlled by a trigger circuit 25 which is in turn actuated by impulses emitted by the trigger circuit 2 and through the gate 26. It is recalled that the carryover is potentially produced at the time $3t$ or $4t$ after the origin of each binary period by the operative state of the trigger 2, which renders the gate 8 conductive at the end of the same period, that is to say, at the time $6t$.

If it is assumed that a 9 is produced with carry-over for the last figure to the left of the results, this will be equivalent to stating that the operation 16—1=15 produces a 15 in S1 comprising four impulses four impulses of values 1, 2, 4, and 8 (for this reason, the detection of a 15 in S1 could also be utilised to control the rectification) and that this fourth impulse will be followed by a carry-over. At a time $5t$ after this impulse of value 8, and while this carry-over is potentially stored in the trigger 2, as hereinbefore stated, an external source applies to the terminal $T(n+5t)$ a special timing impulse which is thus only produced at every *np*, *n* being the number of figures which can be contained in the loop S1—S2—22. This impulse causes the trigger circuit 2 to change over, the effect of which is on the one hand to block the gate 8 (so that the carry-over is suppressed) and on the other hand to send to the gate 26 the desired control impulse, which can pass if the said special timing impulse is sufficiently wide in relation to the change-over time of the trigger circuit 2.

The mechanism for the actuation of the trigger circuit 25 also operates in the case of the second operating phase, although there is produced this time, at the last figure, 16−10=6 and a carry-over (potentially) which permits of obtaining a new change-over, but in the opposite direction, of the trigger 25.

At 27 there is shown a neon valve attached to the said trigger circuit, which conventionally translates the sign of the result of the operation, but it is obvious that the sign may be recorded or retained in any known manner.

The invention is obviously applicable to accounting machines controlled by perforated cards, in which two variable elements in a series of cards passing successively, the relative values of which are unknown a priori, must be subtracted. It is clear that with the method and with means similar to those of the present invention it is unnecessary first to compare the relative values of two numbers (read on the cards and transferred into memories in known manner) in order to effect the subtraction, and that it is possible to enter the sign of the difference automatically in each card by means of a special mark.

With regard to the construction of a subtractor assembly capable of supplying the absolute value of the difference, and if desired the sign thereof, regardless of the manner in which the initial terms are entered, many different forms are possible within the scope of the invention which differ from the specific construction hereinbefore described purely by way of illustration. by applying the principles given for the method according to the invention, and if desired certain features of the said specific construction.

What is claimed is:

1. In an electronic computing apparatus having a pulse circulation loop including a time delay element and an electronic subtractor the latter being adapted to subtract a subtrahend term (B) from a minuend term (A) without regard to the relative magnitude of said terms, each term represented by a serial train of pulses in coded group form, the successive positions in each group representing the value of successive digits of the binary series, a switching device and connections normally for connecting an output terminal of said delay element to a minuend input of said subtractor during a first circulation cycle, this cycle corresponding to a determined number of pulse groups, and detection means connected to an intermediate point of said subtractor to detect whether a carry pulse is produced at that point for the latest position of the final group during said first circulation cycle, said detection means controlling said switching device and connections, upon such a detection, so that said output of the delay element will be disconnected from said minuend input and connected to a subtrahend input of said subtractor during a second circulation cycle.

2. In an electronic computing apparatus of the type having a pulse circulation loop including a first time delay element and an electronic substracting device, the latter being adapted to subtract a substrahend term (B) from a minuend term (A) without regard to the relative magnitude of said terms, each term represented by a serial train of pulses in coded group form, the successive positions in each group representing the value of successive digits of the binary series, said subtracting device comprising a first binary subtractor and a second binary subtractor, each with means for producing carry pulses, the second subtractor receiving through another delay element uncorrected pulse groups of the difference $A-B$ from said first subtractor, carry detection means connected to an output of said first subtractor for detecting any carry pulse produced at the end of an uncorrected pulse group, and adapted to control the introduction of filler pulses into the second subtractor with substantially a delay of one pulse group, whereby the pulse groups passed by the second subtractor onto said first delay element represent the corrected difference $A-B$, a switching device and connections normally for connecting the output terminal of said first delay element to a minuend input of said first subtractor during a first circulation cycle, this cycle corresponding to a determined number of pulse groups, and further carry detection means connected to said first subtractor to detect whether a carry pulse is produced for the latest position of the final group during said first circulation cycle, said detection means controlling said switching device and connections upon such a detection, so that said output of the first delay element will be disconnected from said minuend input and connected to a subtrahend input of said first subtractor during a second circulation cycle.

3. Electronic computing arrangement for calculating the true value of the difference between two decimal numbers without regard to the relative magnitude of said numbers, each number being represented by a serial train of pulses in binary coded group form, the successive positions in each group representing the value of successive digits of the binary series, this arrangement having a time delay network associated with a decimal subtracting device to form a pulse circulation loop, said subtracting device including a first binary subtractor with a minuend input, a subtrahend input and a carry output, a second binary subtractor and 6-correcting means for controlling the second subtractor to correct by a subtraction of 6 any pulse group at the end of which a carry pulse occurs in the first subtractor, a circuit control device and connections associated thereto normally to connect operatively an output terminal of said delay network to said minuend input of the first subtractor during a first circulation cycle, this cycle corresponding to a determined number of pulse groups, carry detection means made operative by clock pulses and connected to said carry output of the first subtractor to detect whether a final carry pulse is produced at said output for the latest position of the final group of said first cycle, said carry detection means controlling said circuit control device, when such a final carry pulse is detected, so that said output of the delay network will be operatively connected to said subtrahend input of the first subtractor during a following second circulation cycle.

4. Electronic computing arrangement as claimed in claim 3, in which said circuit control device comprises two gating devices with each an input terminal connected to the output terminal of said delay network, the first one being connected to said minuend input and the second one being connected to said subtrahend input, and a bistable trigger circuit having an input connected to said carry detection means and selectively controlling said gating devices in order that, as long as said final carry pulse does not occur, the trigger circuit remains in an unset condition thereby causing said first gating means to be oberative, whereas as soon as said final carry pulse is detected, the trigger circuit assumes a set condition thereby causing said second gating means to be operative.

5. Electronic computing arrangement as claimed in claim 4, in which said carry detection means comprises a gate circuit under control of timed pulses with a repetition rate such that it can transmit a final carry pulse at the end of said second circulation cycle to the said trigger circuit for switching the latter from the set condition to the unset condition.

References Cited in the file of this patent

FOREIGN PATENTS

| | | |
|---|---|---|
| 1,041,729 | France | June 3, 1953 |
| 1,044,678 | France | June 24, 1953 |

OTHER REFERENCES

Electronic Engineering: "Serial Digital Adders for a Variable Radix of Notation by Townsend" (pp. 410–416), October 1953.